United States Patent [19]

Sakane et al.

[11] Patent Number: 4,809,298
[45] Date of Patent: Feb. 28, 1989

[54] RADIO DATA TRANSMISSION SYSTEM

[75] Inventors: Toshiaki Sakane, Nasu; Sadao Takenaka, Yokohama; Morihiko Minowa, Machida; Yoshihito Aono, Nasu; Yoshimasa Daidoh, Yokohama, all of Japan

[73] Assignee: Fujitsu Limited, Kawasaki, Japan

[21] Appl. No.: 53,396

[22] PCT Filed: Aug. 27, 1986

[86] PCT No.: PCT/JP86/00437
§ 371 Date: Apr. 30, 1987
§ 102(e) Date: Apr. 30, 1987

[87] PCT Pub. No.: WO87/01535
PCT Pub. Date: Mar. 12, 1987

[30] Foreign Application Priority Data

Aug. 30, 1985 [JP] Japan ................................ 60-191318
Oct. 14, 1985 [JP] Japan ................................ 60-226897

[51] Int. Cl.[4] ........................ H04L 25/49; H04B 7/005
[52] U.S. Cl. ......................................... 375/17; 375/20; 375/15; 333/18

[58] Field of Search ...................... 375/15, 18, 17, 20, 375/39, 103, 41, 42, 52, 57, 58; 333/18

[56] References Cited

U.S. PATENT DOCUMENTS 3,196,352  7/1965  Hopner et al. ......................... 375/17
3,761,818  9/1973  Tazaki et al. ......................... 375/20
3,795,865  3/1974  Armstrong ............................ 375/17
4,320,499  3/1982  Muilwijk et al. ..................... 375/17
4,355,397 10/1982  Stuart .................................. 375/17

Primary Examiner—Douglas W. Olms
Assistant Examiner—Marianne Huseman
Attorney, Agent, or Firm—Staas & Halsey

[57] ABSTRACT

The present invention relates to a radio transmission system. The system includes a transversal type automatic equalizer which controls tap weight based on bit error rate (BER) from a pseudo error pulse. In the equalizer, the threshold value (BER1) which defines the mode change for tap weighting control from normal to reset is different from the threshold value (BER2) from reset to normal. Therefore, the mode change is carried out by a simple circuit properly and stably.

7 Claims, 11 Drawing Sheets

RADIO DATA TRANSMISSION SYSTEM

BACKGROUND OF THE INVENTION

1. Field of the Invention

The present invention relates to a radio data transmission system which realizes multi-level amplitude modulation and more particularly to a radio data transmission system comprising a transversal type automatic equalizer which is capable of changing the mode of a weighting circuit control signal.

2. Description of the Related Art

In a radio data transmission system, multi-path interference occurs resulting in fading because the signal waves pass different routes depending on the conditions of air. This fading causes the frequency characteristic of the radio propagation path to change and thereby generates inter-symbol interference due to waveform distortion. Therefore, an automatic equalizer is necessary for eliminating such inter-symbol interference. To provide such an automatic equalizer, a transversal type automatic equalizer which controls signals within the time domain is often employed.

This transversal type automatic equalizer realizes automatic control of the equalizing function by tap control (weighting control) of the weighting circuit thereof. Therefore, efficiency of control is directly related to the control characteristic and it is essential to improve the tap control performance. In addition, it is a recent trend that an integrated circuit is often employed for said transversal type automatic equalizer and it is also expected in line with such tendency to develop a circuit structure which helps reduction in the size of such a tap control system.

A new transversal type automatic equalizer comprises a delay means with taps, such as a shift register which sequentially delays input signals to a delay line, multipliers connected to respective taps, adders which add the outputs of multipliers, discriminators which discriminate levels of output signals of the adders and control means with weighted taps which detect an error signal corresponding to inter-symbol interference, estimate a degree of inter-symbol interference by adding error signals to correlation circuits and controls the multipliers.

The discriminator discriminates the level of added outputs, detects an error based on signal level required at the time of discrimination, detects pulses, which pulses at the time of discrimination, are causing such error, by using correlation circuit and makes the error approach zero by controlling the weighting the coefficient of the multiplier) for the pulses which give inter-symbol interference.

The tap weighting control of the transversal type automatic equalizer is carried out in the following two modes; one is the normal mode for the above controls and the other is the reset mode where equalization is not carried out by fixing the weighting of the main taps to the reference values and setting the weighting of the taps other than the main taps to zero. These modes are switched in accordance with the equalizing condition.

The mode switching control has been conducted using an accummulated value of erroneous discrimination of frame signals inserted for each frame of transmission data, in place of the predetermined value.

However, in the mode switching explained above, the signal which is used, for controlling the mode switching cannot be extracted if the accummulated pulses do not reach a considerably large value and accordingly it is impossible to execute fine control for mode switching and improvement in tap weighting control performance becomes insufficient. Moreover, such mode switching control is followed by a disadvantage that the necessity of performing frame synchronization requires a relatively large tap weighting control circuit.

Therefore, it is strategically considered to use a discriminator which discriminates levels of multivalue signals in more detail than the number of bits of the transmission data and outputs the digital signals in such a number of bits as is larger than the number of bits of data in order to always monitor the line condition with a simplified additional circuit, while generating a pseudo error signal using the extra bits and executing tap weighting control depending on the frequency of such pseudo error signals. However, the generating frequency of the pseudo error signal is considerably influenced by the equalizing condition because the digital values are discriminated in more detail than the transmission data. Accordingly, it is probable that the generating frequency of the pseudo error signal becomes low and it is misjudged that the line condition is improved and the reset mode is switched to the normal mode. In this case the transversal type automatic equalizer produces abnormal values of tap weighting due to deterioration of line conditions in the reset mode attaining the no equalizing condition. Since the line condition is actually not improved, the equalizer is returned again to the reset mode. Namely, the equalizer produces unstable control conditions by being switched between the normal mode and the reset mode and thereby a problem that judgement of line quality frequently changes arises.

Moreover, the transversal type automatic equalizer shows distortion resistance frequency characteristics (signature) which are largely different when fading gradually becomes large, causing a bit error rate to increase, or when a bit error rate in the line OFF condition or the equivalent gradually becomes smaller because fading gradually decreases, and shows a hysteresis characteristic. Namely, even in a receiving condition of the same bit error rate, if the bit error rate changes to a large value from a small value, the automatic equalization is carried out but, on the contrary, when the bit error rate changes to a small value from a large value, the automatic equalization is not carried out in a certain range.

SUMMARY OF INVENTION

With the aforementioned problems of the prior art, it is a first object of the present invention to realize fine and stable switching control for the control mode of a transversal type automatic equalizer in a radio data transmission system with a simplified circuit and moreover it is a second object of the present invention to reduce hysteresis of the distortion resistance frequency characteristic.

In view of realizing the objects described above, the present invention attains the first object by a structure in which a transmitting apparatus converts n-bit transmission data to a multivalue signal and transmits the signal as a radio signal after amplitude modulation; a receiving apparatus discriminates the multivalue signal obtained by receiving and demodulating said radio signal, converts it to n+m bits, switches between a plurality of control modes, for example, a normal mode and a reset mode in accordance with the frequency of pseudo error pulses generated by using the lower m bits, and thereby distinguishing between the threshold values for changing the control mode to the reset mode from the normal mode and for changing it to the normal mode from the reset mode. The present invention attains the second object by providing an MLE mode which mainly controls the main tap using the maximum level error (MLE) signal between a normal mode and the reset mode.

DESCRIPTION OF THE PREFERRED EMBODIMENTS

First Embodiment

Figure 1:
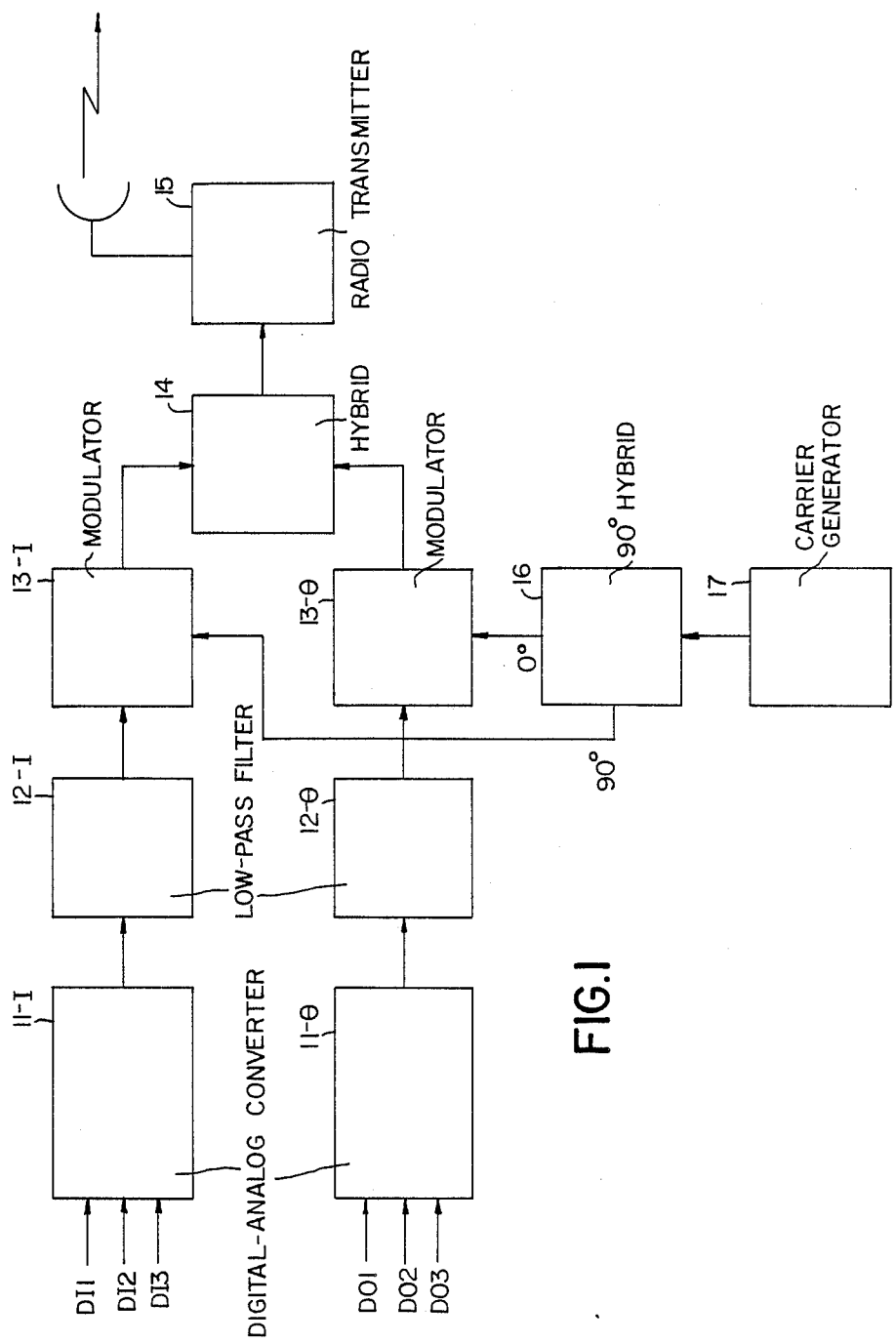
FIG. 1 is a block diagram of the transmitting part of the system to which the present invention is adapted.
Figure 2:
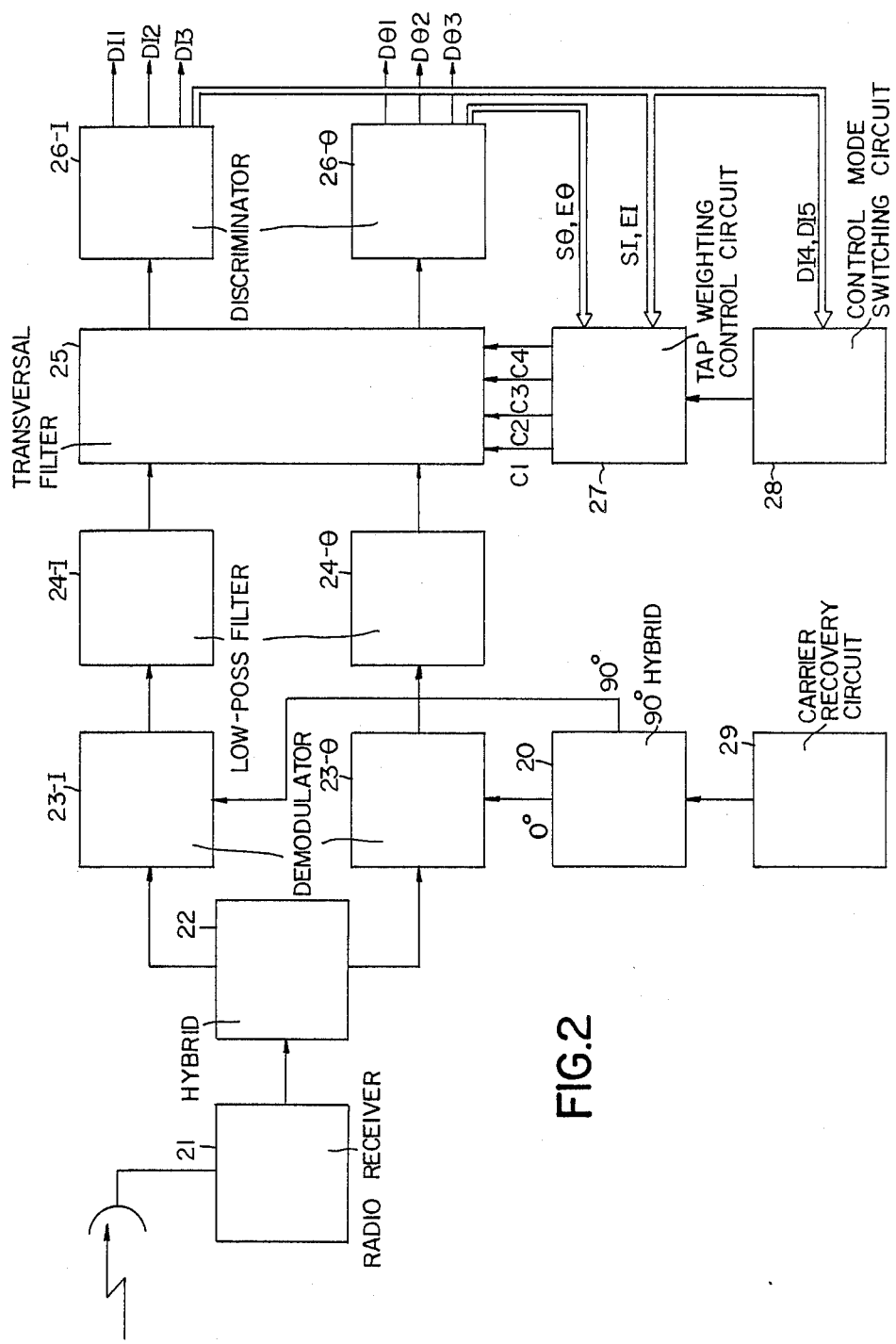
FIG. 2 is a block diagram of the receiving part of the system to which the present invention is adapted.

FIG. 1 and FIG. 2 respectively show an example of the system to which the present invention is adapted.

FIG. 1 is a block diagram of the sending part, while FIG. 2 a block diagram of the receiving part. This system utilizes 64-level quadrature amplitude modulation (64-QAM).

In FIG. 1, the digital-analog converters 11-I and 11-Q are respectively responsive to the transmission data $D_{I1}$, $D_{I2}$, $D_{I3}$ of 3 bits of the in-phase channel (I-ch) and the transmission data $D_{Q1}$, $D_{Q2}$, $D_{Q3}$ of 3 bits of the quadrature channel (Q-ch) and provide outputs after conversion to 8-level signals. The low-pass-filters 12-I and 12-Q are respectively responsive to said 8-level signals and provide outputs of 8-level signals from which high frequency components are eliminated to the modulators 13-I and 13-Q.

Meanwhile, a carrier generator 17 generates a carrier signal and outputs it to a 90° hybrid circuit 16, which branches said carrier into two carriers with a phase difference of 90° and outputs these carriers to the modulators 13-I and 13-Q.

The modulators 13-I and 13-Q modulate said branched carriers with said filtered 8-level signals and provide modulated outputs. The hybrid circuit 14 combines the modulated signals sent from the modulators 13-I and 13-Q and provides an output. A radio transmitter 15 transmits the combined signal of said hybrid circuit 14 as a radio signal.

In FIG. 2, a radio receiver 21 receives said transmitted radio signal and provides an output to the hybrid circuit 22. The hybrid circuit 22 branches the received signal into two portions and provides outputs respectively to the demodulators 23-I and 23-Q.

Meanwhile, a carrier recovery circuit 29 regenerates the carrier on the basis of the received signal and outputs the carrier to the 90° hybrid circuit 20, which branches said recovered carrier into two recovered carrier signals with a phase difference of 90° and outputs these carriers to the demodulators 23-I and 23-Q. The demodulators 23-I and 23-Q respectively demodulate the received signals on the basis of the branched recovered carrier signals and provide as outputs 8-level signals I-ch and Q-ch. The low-pass-filters 24-I and 24-Q respectively eliminate noise in the demodulated 8-level signals sent from the demodulators 23-I and 23-Q and provide the outputs. The transversal filter 25 removes inter-symbol interference and inter-channel interference in the demodulated 8-level signals sent from said low-pass-filters 24-I and 24-Q and provides outputs to the dicriminators 26-I and 26-Q. The discriminators 26-I and 26-Q respectively discriminate the 8-level signals I-ch and Q-ch sent from said transversal filter 25, and output the transmission data $D_{I1}$, $D_{I2}$, $D_{I3}$ and $D_{Q1}$, $D_{Q2}$, $D_{Q3}$ of 3 bits and output the signals for equalization control to the tap weighting control circuit 27 and control mode switching circuit 28. Said tap weighting control circuit 27 controls said transversal filter 25 for equalization on the basis of the signals sent from the discriminators 26-I and 26-Q. Namely, a transversal type automatic equalizer is composed of a transversal filter 25, discriminators 26-I, 26-Q, tap weighting control circuit 27 and control mode switching circuit 28.

Figure 3:
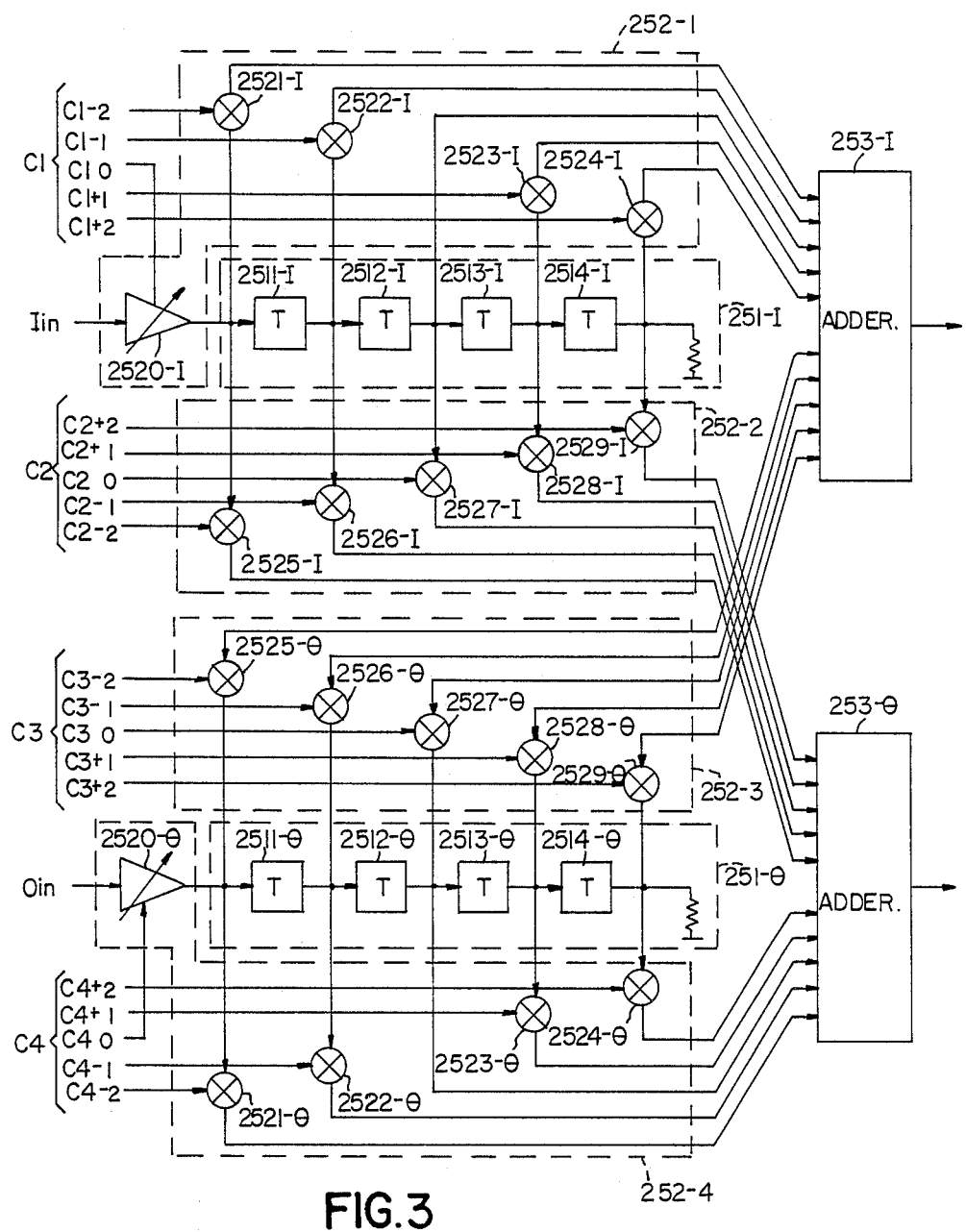
FIG. 3 is a block diagram of a transversal filter.

FIG. 3 shows the detailed structure of said transversal filter 25.

In FIG. 3, the delay means 251-I and 251-Q are respectively composed of the delay elements(T) 2511-I to 2514-I and 2511-Q–2514-Q, while the weighting means 252-1–252-4 are respectively composed of a variable gain amplifier 2520-I, multipliers 2121-I-2524-I; multipliers 2525-I–2529-I; multipliers 2525-Q–2529-Q; a variable gain amplifier 2520-Q and multipliers 2121-Q-2524-Q, respectively. $C1_{31\,2}$–$C1_{+2}$, $C2_{-2}$–$C2_{+2}$, $C3_{-2}$–$C3_{+2}$, $C4_{-2}$–$C4_{+2}$ are weighting signals of variable gain amplifiers and multipliers. The weighting means 252-1 and 252-4 do not have a multiplier connected to the main taps, and thus, the gain of the variable gain amplifiers 2520-I and 2520-Q directly set the amplitudes of main taps. Namely the variable gain ampalifiers 2520-I and 2520-Q equivalently correspond to the multipliers of the main taps in the weighting means 252-1 and 252-4.

The demodulated multi-level signals $I_{in}$ and $Q_{in}$ of the I-ch and Q-ch channels are applied to the variable gain amplifiers 2520-I, 2520-Q, respectively. The output signals are sequentially delayed by the delay circuits 2511-I to 2514-I, 2511-Q–2514-Q, and the in-phase component and quadrature component are respectively sent to the adders 253-I, 253-Q through the multipliers 2521-I'–2529I, 2521-Q–2529-Q and added therein. The added output signals of adders 253-I, 253-Q are then respectively applied to the discriminators 26-I, 26-Q of FIG. 2.

The discriminators 26-I, 26-Q discriminate the levels of said added output signals and can output up to two more bits than the bits of transmission data. For example, when these discriminators are used with 16-level QAM, a discrimination output of 4 bits can be obtained because the transmission data is 2 bits for each channel, while adapted to 64-level QAM, a discrimination output of 5 bits can be obtained because the transmission data is 3 bits for each channel and when adapted to 256-level QAM, a discrimination output of 6 bits can be obtained because the transmission data is 4 bits for each channel.

In the case of this embodiment, since the discriminators are adapted to 64-level QAM, the first through third bits $D_{I1}-D_{I3}$, $D_{Q1}-D_{Q3}$ of the discrination signals are applied to the processing circuits in the succeeding stages as shown in FIG. 2, the first bits $D_{I1}$ and $D_{Q1}$ are considered as sign signals. SI, SQ, while the fourth bits as are considered error signals EI, EQ, and these signals are applied to the tap weighting control circuit 27 as illustrated in FIG. 2.

The fourth and fifth bits $D_{I4}$, $D_{I5}$ of I-ch are applied to the control mode switching circuit 28.

Figure 4:
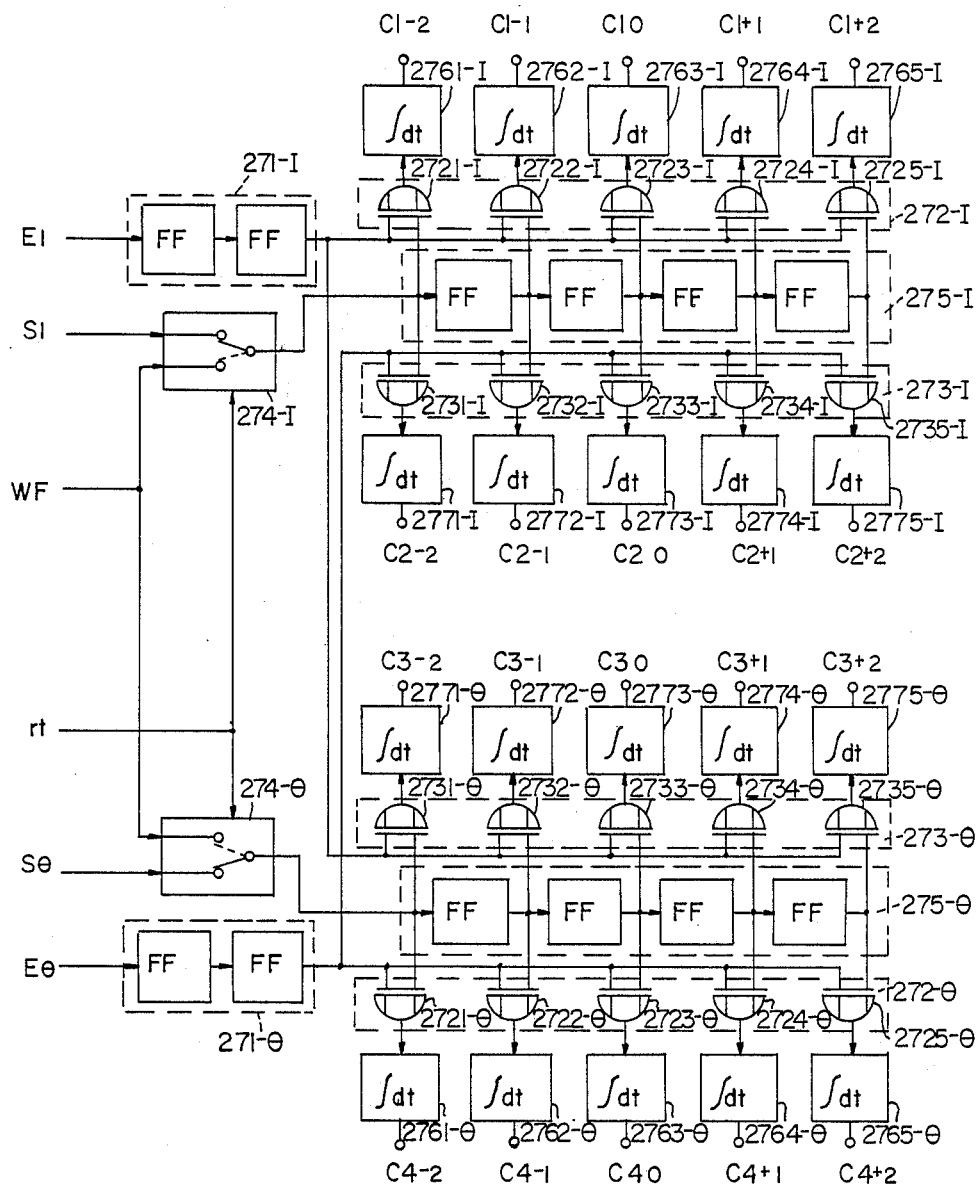
FIG. 4 is a block diagram of a tap weighting control circuit in the first embodiment.

FIG. 4 is a detailed block diagram of the tap weighting control circuit 27.

In FIG. 4, the error signals $E_I$ and $E_Q$ are respectively applied to one of the input terminals of the exclusive OR gates (EX-OR) 2721-I–2725-I and 2731-Q–2735-Q, and 2721-Q–2725-Q and 2731-I–2735-I of the correlation circuits 272-I, 273-Q, 272-Q and 273-I, through the shift registers 271-I and 271-Q, each consisting of two flip-flops (FF). The sign signals $S_I$ and $S_Q$ are generally applied to the shift registers 275-I and 275-Q consisting of four flip-flops through the switches 274-I and 274-Q. These shift registers 275-I and 275-Q output the signals $S_I$ and $S_Q$ with the same delay time as that of each tap of the delay portions 251-I, 251-Q in the transversal filter 25 and are applied to the other input terminals of the EX-OR gates of the correlation circuits 272-I, 273-I, 273-Q and 272-Q. The outputs of the EX-OR gates 2721-I–2725-I, 2731-I–2735-I, 2731-Q–2735-Q, 23721-Q–2725-Q are respectively integrated by the integral circuits 2761-I–2765-I, 2771-I–2775-I, 2771-Q–2775-Q, 2761-Q–2765-Q to produce the weighting signals $C1_{-2}-C1_{+2}$, $C2_{-2}-C2_{+2}$, $C3_{-2}-C3_{+2}$, $C4_{-2}-C4_{+2}$ as outputs.

Figure 5:
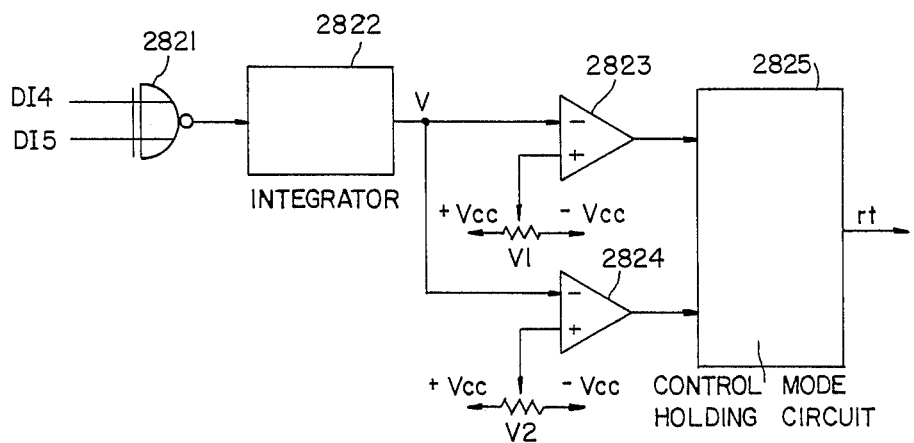
FIG. 5 is a block diagram of a control mode switching circuit in the first embodiment.

FIG. 5 is a detailed block diagram of the control mode switching circuit 28.

Figure 6:
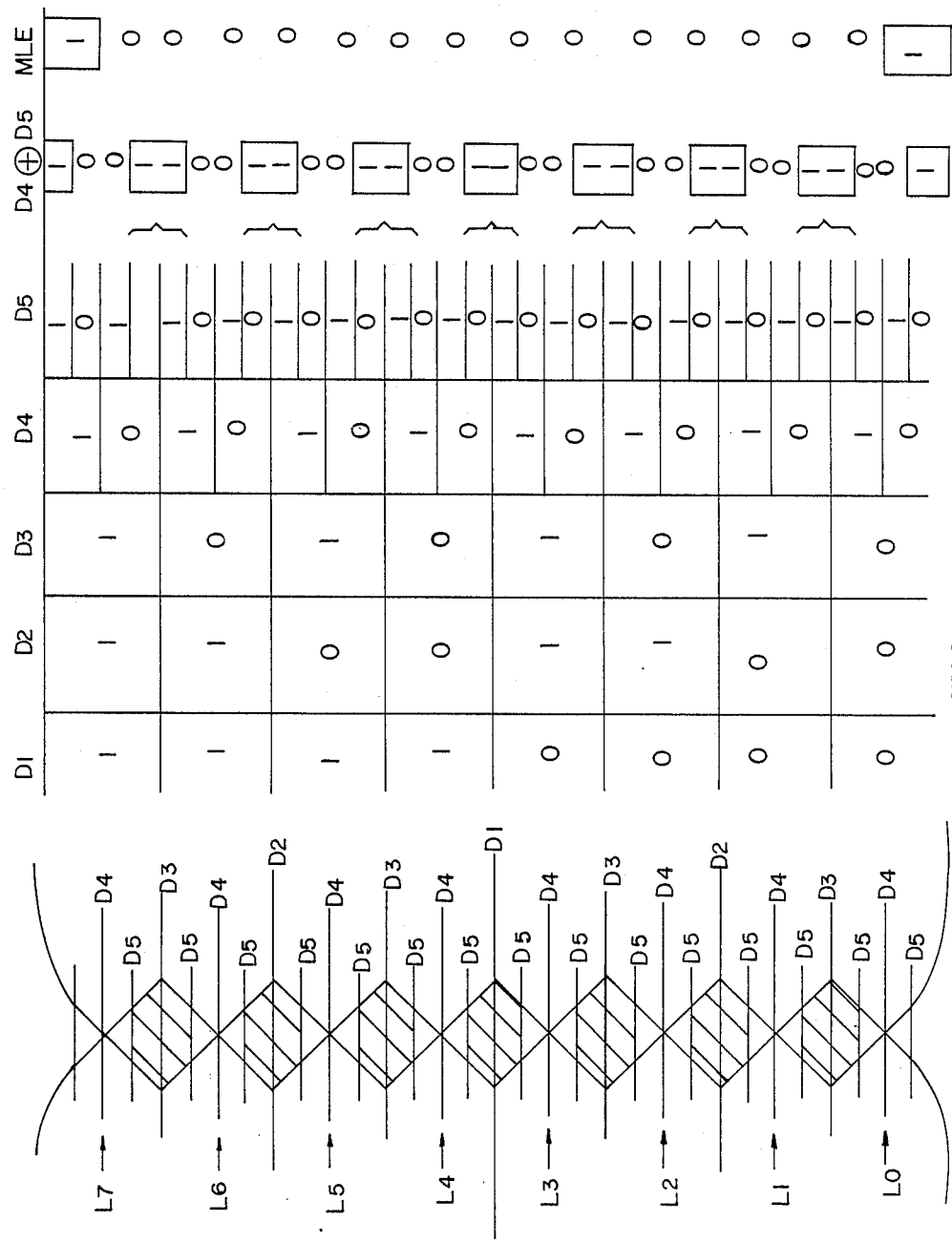
FIG. 6 shows a relationship between input levels and output bits in a discriminator.
Figure 7:
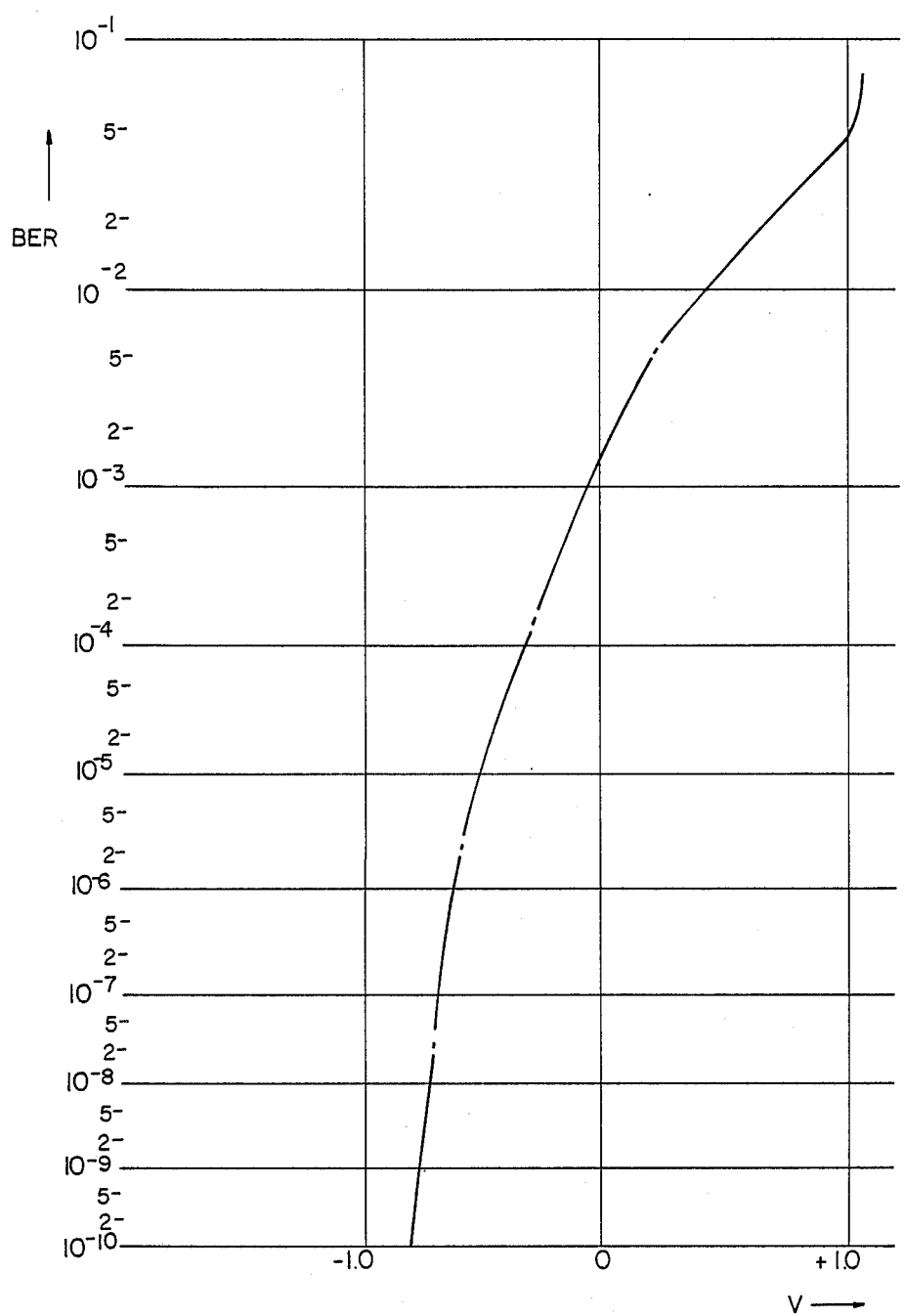
FIG. 7 is a graph representing a relationship between bit error rate and integral circuit output voltage.

In FIG. 5, the fourth bit $D_{I4}$ of and fifth bit $D_{I5}$ of the discriminator 26-I shown in FIG. 2 are input to the exclusive NOR (EX-NOR) gate 2821. In general, the fourth bit $D_4$ and fifth bit $D_5$ of from a discriminator which discrimininates an 8-level signal further divide the range of eight level $L_0-L_7$ for discrimination of an input signal to the discriminator as shown in FIG. 6 into four ranges. An EX-NOR of $D_4$ and $D_5$ (indicated by $D_4 \oplus D_5$) becomes "1" when $D_4$ and $D_5$ are the same and becomes "0" at otherwise. When $D_4 \oplus D_5$ is "1", it is considerably probable that it is discriminated at the next level and it can be used as the pseudo error pulse. The integrator 2822 integrates the pseudo error pulses and outputs voltage V corresponding to the generation frequency of pseudo error pulses. FIG. 7 shows a relationship between the actual bit error rate BER and output voltage V of integrator 2822.

The comparator 2823 compares an output voltage V of integrator 2822 and voltage $V_1$ corresponding to the predetermined error rate BER1 and provides a comparison output. The comparator 2824 compares an output voltage V of the integrator 2822 and the voltage $V_2$ corresponding to the predetermined error rate BER2 and provides a comparison output.

Figure 8:
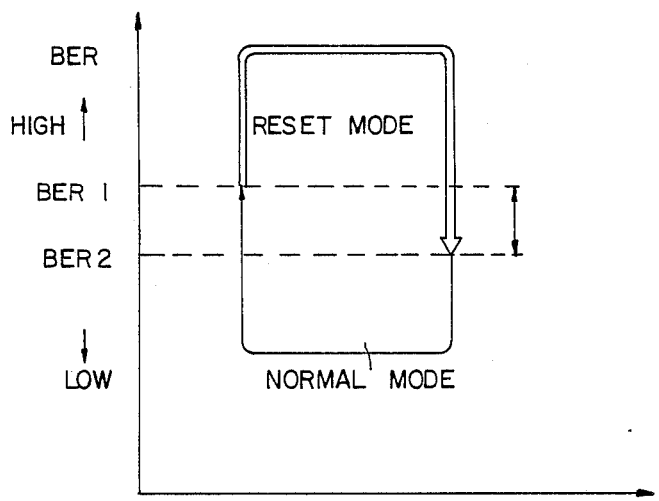
FIG. 8 shows mode switching between the normal mode and the reset mode.

The control mode holding circuit 2825 holds the control mode and uses the error rate BER1 as a threshold value for switching the control mode to the reset mode from the normal mode as shown in FIG. 8 or the error rate BER2 as a threshold value for switching the control mode to the normal mode, based on the comparison results of comparators 2823 and 2824. In the reset mode, the reset signal rt is output.

In FIG. 4, the reset signal rt is applied to the switches 274-I and 274-Q. In the reset mode, the switches 274-I and 274-Q are in the condition indicated by the dotted lines and output the alternate signals WF of "0" and "1". Since the alternate signal WF does not correlate with the input signal, outputs of respective integrators 2761-I–2765-I, 2771-I–2775-I, 2771-Q–2775-Q, 2761-Q–2765-Q all become zero or a value near to zero. Thereby, the gains of variable gain amplifiers 2520-I and 2520-Q become the reference gain, coefficients of multipliers 2521-I–2529-I, 2521-Q–2529-Q become zero and the demodulated multi-value signals $I_{in}$, $Q_{in}$ of the I-ch and Q-ch channels are not equalized and are amplified only with a constant gain and input to the discriminators 26-I and 26-Q shown in FIG. 2. Namely, the tap weighting control circuit 27 and transversal filter 25 are reset.

Second Embodiment

Figure 9:
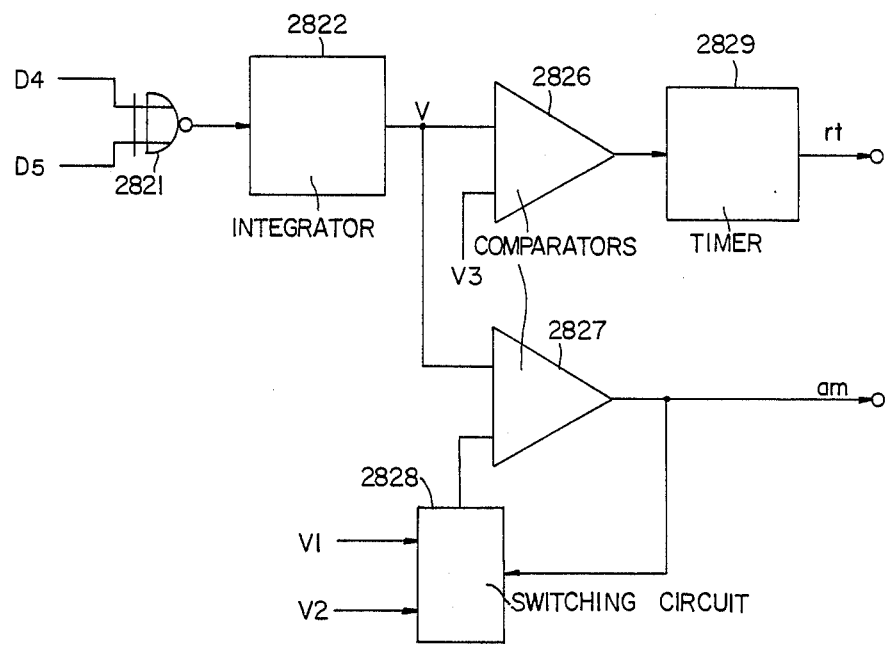
FIG. 9 is a block diagram of a control mode switching circuit in the second embodiment.
Figure 10:
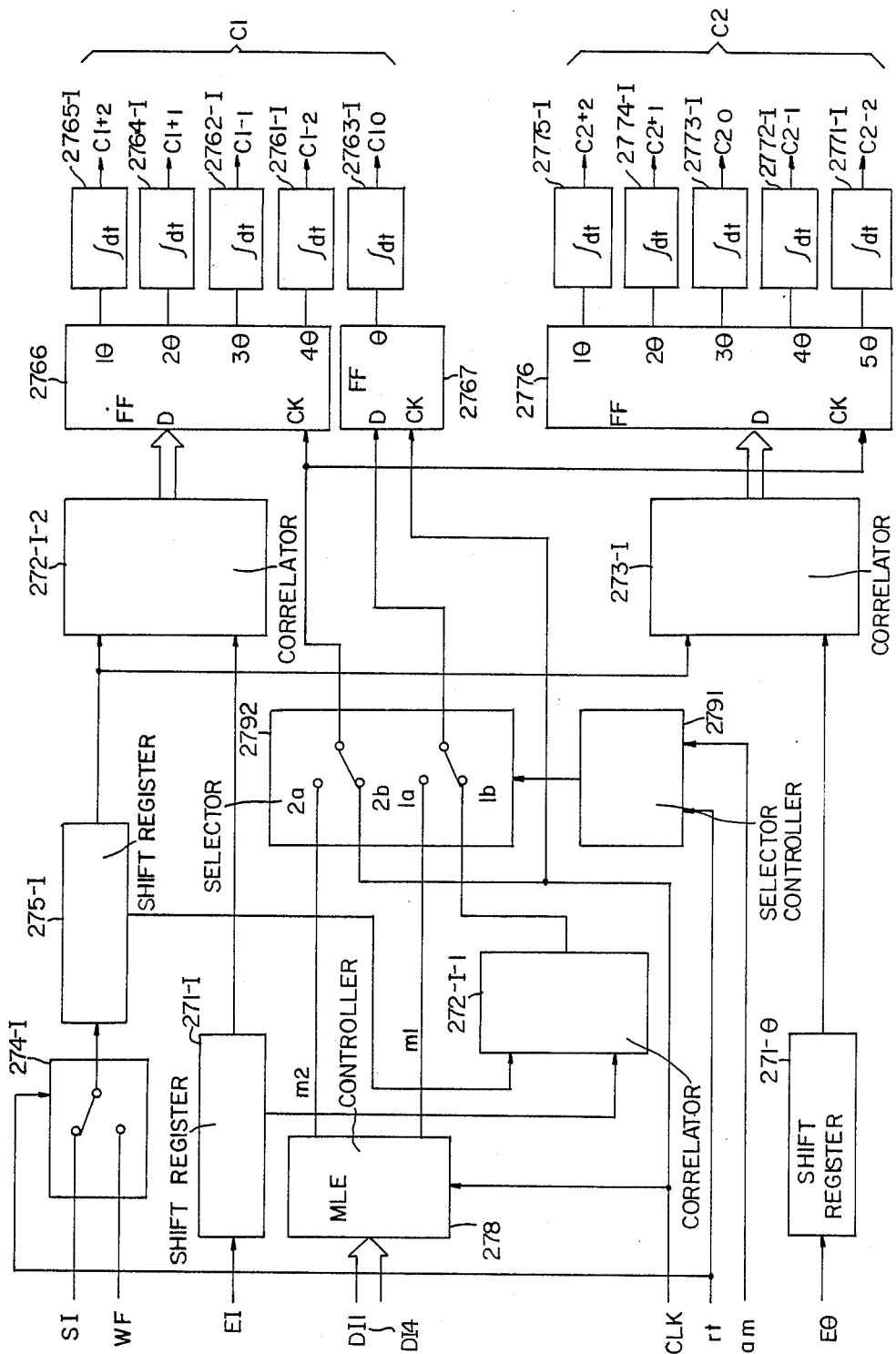
FIG. 10 is a block diagram of a tap weighting control circuit in the second embodiment.

FIG. 9 is a block diagram of a control mode switching circuit of a second embodiment of the present invention. FIG. 10 is a block diagram of the tap weighting control circuit of the second embodiment of the present invention.

In the second embodiment of the present invention, the maximum level error (MLE) mode is provided between the normal mode and the reset mode.

In FIG. 9, the EX-NOR gate 2821 and integrator 2822 output voltages V corresponding to pseudo error pulse generation frequency as in the case of FIG. 5. This output voltage V is compared with the first, second and third values V1, V2, V3 which are preset by the comparators 2826, 2827. In this case, these values are set in the relation, V2<V1<V3 and respectively correspond to the bit error rates $5 \times 10^{-3}$ (BER1), $5 \times 10^{-5}$ (BER2), $6 \times 10^{-2}$ (BER3).

In the normal mode, the switching circuit 2828 selects V1 and outputs it to the comparator 2827. When the comparator 2827 detects that the bit error rate becomes worse than BER1 and issues an alarm signal am, the comparator 2828 selects V2 and outputs it to the comparator 2827.

The timer 2829 outputs the reset signal rt for each predetermined period when the comparator 2826 detects that the bit error rate becomes worse than BER3.

Figure 11:
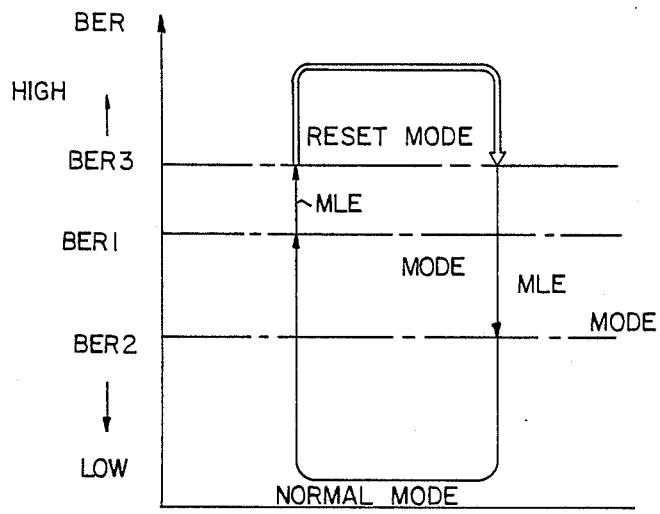
FIG. 11 shows mode switching among the normal mode, the MLE mode and the reset mode.

FIG. 11 is a diagram for mode switching in the second embodiment. When the bit error rate is lower than BER2 (for example, $5 \times 10^{-5}$), the normal mode is selected. When the bit error rate in normal mode becomes higher than BER1 (for example, $5 \times 10^{-3}$) which is greater than BER2, control is switched to the MLE mode. When the bit error rate is lower than BER2 in this MLE mode, the MLE mode is switched to the normal mode, but if the bit error rate becomes higher than BER3 (for example, $6 \times 10^{-2}$) which is greater than BER1, the MLE mode is switched to the reset mode. This reset mode is switched to the MLE mode when the bit error rate becomes smaller then BER3. Corresponding to the bit error rates BER1 BER3, said first to third values V1-V3 are set.

In FIG. 10, the in-phase side circuit structure is indicated because the circuit structure is the same in both the in-phase side and quadrature side. In this figure, like parts as those in FIG. 4 are given the like symbols. 278 is an MLE controller, 2792 is a selector, 2791 is a selective controller, and 2766, 2767, 2776 are flip-flop (FF's). CK is clock signal terminal, D is data terminal, and Q1-Q5 are output terminals.

The MLE control means 278 is responsive to the upper four bits $D_{I1}$-$D_{I4}$ among the discrimination output of 5 bits from the discriminator 26-I shown in FIG. 2 and outputs the signals m1 and m2 for the MLE control. The MLE control will be explained later in detail.

The correlator 272-I-1 corresponds to a part of the correlator 272-I (FIG. 4) connected to the main tap, while the correlator 272-I-2 corresponds to the other portions of correlation 272-I.

The selector controller 2791 controls the selector 2792 with the reset signal rt and the alarm signal am. It switches the selector to the side of contacts 1a, 2a in the MLE mode where only the alarm signal am is applied or to the side of contacts 1b, 2b in the other modes.

In the normal mode, the selector 2792 is in the connecting condition shown in FIG. 10 and the switch circuit 274-I is also in the connecting condition shown in FIG. 10. Therefore, the sign signal SI and error signal EI are applied to the correlators 272-I-1, 272-I-2, the correlation output is applied to the integrators 2761-I, 2765-I through the flip-flop circuits 2766, 2767, and outputs of integrators 2761-I to 2765-I become the tap weighting signal C1 with output of integrator 2763-I as the tap weighting signal $C1_0$. On the other hand, the correlation output of the correlator 273-I to which the sign signal S1 and error signal EQ are applied is applied to the integrators 2771-I–2775-I through the flip-flop 2776-I and becomes the tap weighting signal C2.

As shown in FIG. 6, when the discriminator outputs $D_1$-$D_4$ are all "0" or all "1" for the discrimination of an 8-level signal, it indicates that the input signal is in the outside of the outer most levels $L_0$, $L_7$ among the discrimination levels $L_0$-$L_7$ and therefore it is detected as the maximum level error.

Figure 12:
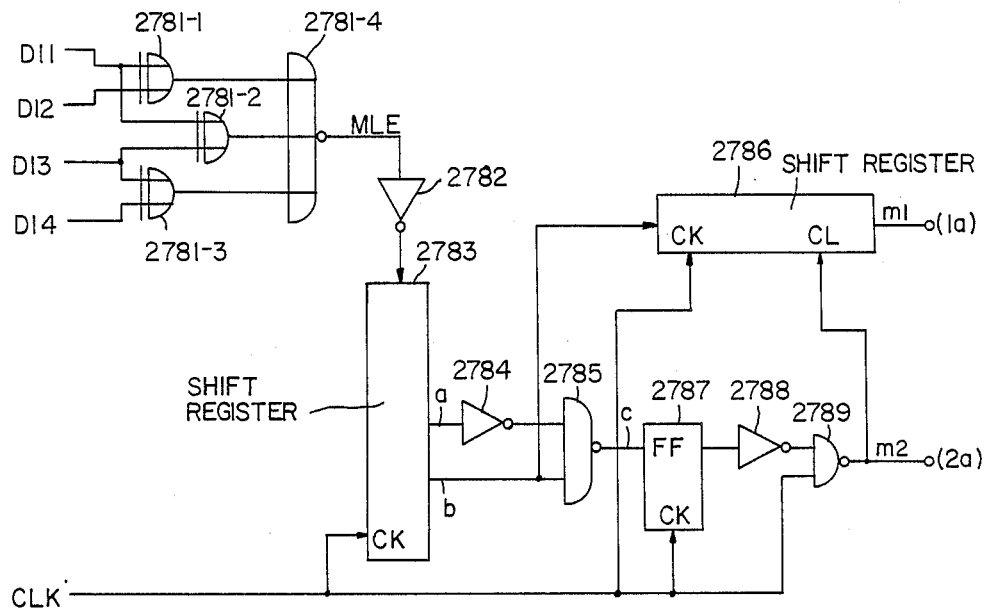
FIG. 12 is a block diagram of an MLE control part.
Figure 13:
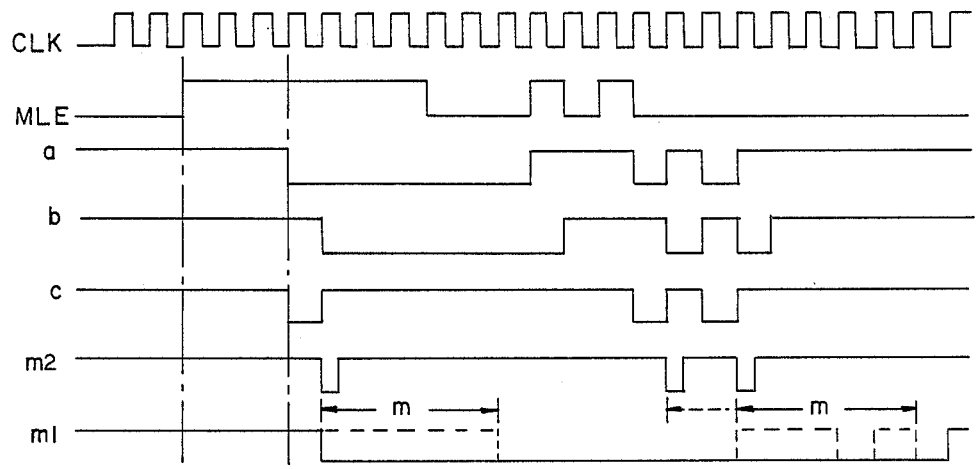
FIG. 13 shows waveforms of signals in FIG. 12.

FIG. 12 is a block diagram of the MLE controller 278. Examples of the signals in FIG. 12 are indicated in FIG. 13 using the same symbols. The clock signal CLK is applied to the shift registers 2783, 2786, the clock terminal of flip-flop 2787 and to the NAND gate 2789. The circuit consisting of the EX-OR gates 2781-1–2781-3 and NOR gate 2781-4 detects the maximum level error, and outputs the maximum level error signal MLE which becomes "1" when $D_{I1}$-$D_{I4}$ are all "0" and when $D_{I1}$-$D_{I4}$ are all "1" and is "0" in all other cases. The maximum level error signal MLE is applied to the shift register 2783 through the inverter 2782 and is shifted in accordance with the clock signal CLK. In case the maximum level error signal MLE has a waveform as indicated in FIG. 13, an output signal (a) of the specified number of stages of the shift registers 283 is delayed as much as a number of stages corresponding to the delay of the main tap at the transversal filter, while an output signal (b) of the next stage is further delayed by one clock signal. The output signal (a) is applied to the NAND gate 2785 through the inverter 2784 while the output signal (b) is directly applied to the NAND gate 2785. Therefore the output signal (c) of NAND gate 2785 becomes equal to the signal (c) shown in FIG. 13, indicating the leading edge of the maximum level error signal MLE.

The output signal (c) of this NAND gate 2785 is applied to the flip-flop (FF) 2787 and its output signal is applied to the NAND gate 2789 through the inverter 2788. The output signal of this NAND gate 2789 becomes the signal m2 which is applied to the contact 2a of the selector 2792 (see FIG. 10).

This signal m2 is applied to the clear terminal CL of the m-bit shift register 2786 in order to shift this shift register. The shift register 2786 shifts the output signal b from the shift register 2783 in accordance with the clock signal CLK, outputs the signal m1 and applies it to the contact 1a of the selector 2792 (refer to FIG. 10).

For example, in 64-level QAM, the maximum level error signal MLE is output on the average once for every 8 bits in each channel under normal operating conditions. Therefore, the mark ratio of the maximum level error signal MLE becomes ⅛. Accordingly, it is essential for setting the mark ratio under the normal operation to ½ that a signal indicative of the maximum level error signal is output four times before the maximum level error is once detected.

Since the maximum level error signal MLE is input to the shift register 2783 through the inverter 2782 in FIG. 12, detection of the maximum level error corresponds to "0". Therefore, when the leading edge of maximum level error signal MLE is detected, the m-bit shift register 2786 is cleared, allowing increase of "0". In case the maximum level error signal becomes "1" in regular 8 bits synchronization, the 3-bit shift register 2786 is desirably prepared, "0" is increased as many as 3 bits for each detection of the maximum level error signal and thereby "0" as many as 4 bits in total can be obtained. However, in practice, the maximum level error signal becomes "1" irregularly, it is probable that there are bits which are initially "0" when the shift register 2786 is cleared. Therefore, it is better that the number of bits of shift register 2786 is set larger than 3. According to the experiments, the optimum number of bits of shift register 2786 is 5 bits for 64-level QAM.

The dotted line in the waveform m1 of FIG. 13 indicates the waveform which will be output if the shift register 2786 is not cleared.

The signal m1 is applied to the data terminal D of flip-flop 2767 through the contact 1a of the selector 2792 (see FIG. 10) under the MLE mode, and the signal with a mark rate of ½ is applied to the integrator 2763-I from the output terminal Q and thereby the integrator output becomes zero. Namely, in this case, the weighting signal $CL_0$ of the main tap becomes zero and the gain of variable gain amplifier 2520-I (refer to FIG. 3) becomes the reference gain.

When the maximum level error becomes large and the leading edge of maximum level error signal MLE is detected frequently, the shift register 2786 is more frequently cleared and therefore the mark rate of output signal m1 of the shift register 2786 becomes less than ½. Under the MLE mode, the signal m1 is applied to the flip-flop 2767 through the selector 2792. When output signal of such flip-flop is applied to the integrator 2763-I, the weighting signal of the main tap becomes negative. Therefore, the amplitude of the input signal is suppressed by the control of variable gain amplifier 2520-I. Namely, the amplitude is controlled so that the maximum level error signal MLE is not output.

The output signal m2 of NAND gate 2789 is applied, under the MLE mode, to the clock terminal CK of flip-flops 2766, 2776 through the selector 2792 and becomes the signal which shows less variation than the clock signal CLK. Therefore, the taps other than the main tap are less controlled and the main tap is mainly controlled in the MLE mode. In case the leading edge of the maximum level error signal MLE is detected frequently, the weighting signal $C1_0$ of main tap changes largely but the pulse of signal m2 is generated frequently. Therefore, control of taps other than the main tap follows the control of main tap.

As explained above, the input signals are equalized by the ordinary tap coefficient control in the normal mode. When bit error rate increases due to fading, the normal mode is switched to the MLE mode and the main tap coefficient control is mainly controlled. Moreover, when the bit error rate increases further, the MLE mode is switched to the reset mode. Here, the selector 2792 is switched to the condition indicated in the figure. Moreover, the switch circuit 274-I is switched to apply the signal WF to the shift register 275-I. Therefore the alternate signal WF of "0" and "1" and the error signals EI, EQ (having the same period as the clock signal CLK) are applied to the correlators 272-I-1, 272-I-2, 273-I and an average of correlation values becomes zero. Accordingly, outputs of the integrators 2761-I–2765-I, 2761-Q–2765-Q become zero. In this case, it is also possible to use means to force the integration outputs of integrators 2761-I–2765-I, 2761-Q–2765-Q to become zero or means to force the average value to become zero by switching in the input side of the integrators 2761-I–2765-I, 2761-Q–2765-Q.

Zero output of integrators 2761-I–2765-I, 2761-Q–2765-Q corresponds to the case wherein the multipliers of FIG. 4 are separated and the gain of the variable gain amplifier is fixed to the reference gain and therefore the equalizing operation is not carried out. In this case, the reset signal rt is output when the timer 2729 shown in FIG. 9 is started. Accordingly, the equalizing operation is carried out by setting the switch circuit 274-I to the side of sign signal SI from the side of signal WF for each specified period in order to check whether the bit error rate is improved or not. Namely, when the control mode is switched to the reset mode, the equalizing operation is carried out periodically in order to make it possible to easily shift to the MLE mode.

Figure 14:
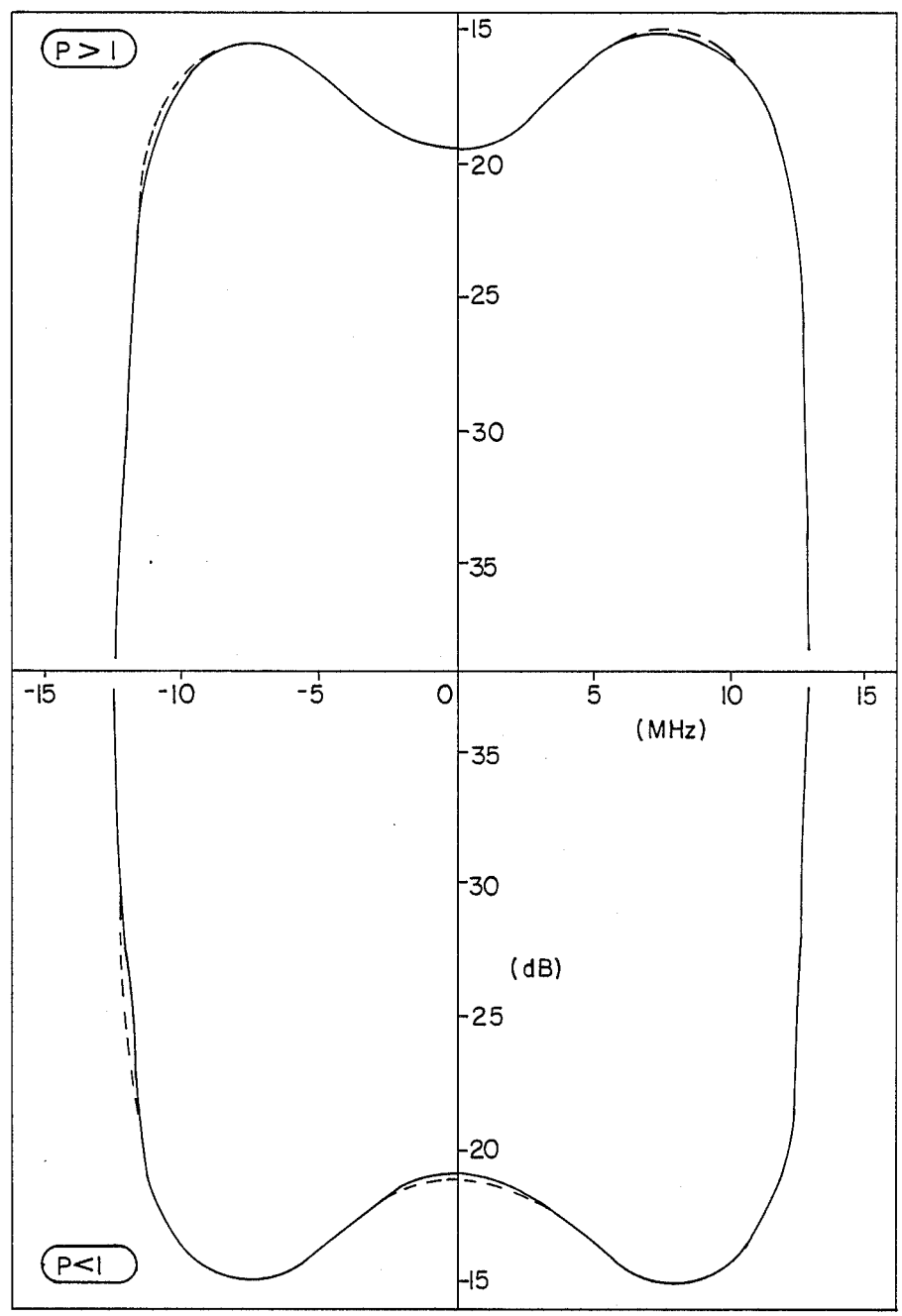
FIG. 14 shows a distortion resistance frequency characteristic.

FIG. 14 shows the distortion resistance frequency characteristic of a transversal type automatic equalizer for 64 values QAM of the embodiment of the present invention where the roll-off rate is 35%. The notch frequency (MHz) is plotted on the X axis while the notch depth (dB) on the Y axis, wherein there is little hysteresis when the fading changes to a large value from a small value (indicated by a solid line) or vice versa (indicated by a dotted line).

The above embodiment is adapted to 64-level QAM, but this invention can also be adapted to other multi-level QAM and and moreover can also be adapted to automatic equalization for the multi-level amplitude modulated signals other than a QAM signal. Moreover, it can be adapted to a case where the number of taps are greater.

In the above first and second embodiments, the control mode switching circuit 28 generates a pseudo error pulses using the output of the discriminator 26-I of I-ch channel, but it may be generated using an output of the discriminator 26-Q and the OR signal of the pseudo error pulse generated from output of discriminator 26-I and the pseudo error pulse generated from output of discriminator 26-Q may be input to the integrator 2822.

The present invention provides an advantage as explained above in that the control mode is switched in accordance with the frequency of a pseudo error pulse generated using the lower bits of transmission data sent from a discriminator, the threshold value for switching the normal mode to the reset mode or the MLE mode is forced to be different from the threshold value for the reverse switching, thereby fine mode switching control can be realized stably with a simple circuit structure. Moreover, since the MLE mode is provided between the normal mode and reset mode, even in a case where the control mode returns to the normal mode after it is set to the reset mode, a certain degree of equalization is carried out by the MLE mode and thereby the reset mode can be quickly returned to the normal mode, resulting in less hysteresis in the distortion resistance frequency characteristic.

We claim:

1. A radio data transmission system, comprising:
    a transmitting apparatus, comprising:
        converting means, operatively connected to receive n-bit data, for converting the n-bit data into a multi-level transmission signal, where n is a positive integer,
        modulating means for modulating a carrier signal with the multi-level transmission signal to produce a modulated signal, and
        transmitting means for transmitting the modulated signal as a radio signal; and
    a receiving apparatus, comprising:
        demodulating means for demodulating the received radio signal and for outputting a multi-level received signal,
        a transversal filter, operatively connected to said demodulating means, having a main tap and other taps, receiving weighting signals for controlling weighting of the main and other taps and for outputting an equalized multi-level signal,
        discriminating means for discriminating levels in the equalized multi-level signal output from said transversal filter and for outputting a converted digital signal of n+m bits, where m is a positive integer,
        tap weighting control means for outputting the weighting signals using at least a part of the digital signal of n+m bits output from said discriminating means, and
        control mode switching means for switching a control mode of said tap weighting control means in accordance with a frequency of a pseudo error pulse generator using at least a part of the lower m bits of the digital signal of n+m bits output from said discriminating means, having a first threshold value for switching from a first control mode to a second control mode among at least two control modes and a second threshold value, different from the first threshold value for switching from the second control mode to the first control mode.

2. A radio data transmission system according to claim 1,
    wherein said converting means comprises two conversion means for conversion of the n-bit data into in-phase channel and quadrature channel multi-level transmission signals, wherein said modulating means performs multi-level quadrature amplitude modulating with the in-phase channel and quadrature channel multi-level transmission signals from said two conversion means, wherein said demodulating means demodulates the received radio signal and outputs in-phase channel and quadrature channel multi-level received signals, wherein said transversal filter includes means for reducing interference between in-phase channel and quadrature channel equalized multilevel signals, and wherein said discriminating means comprises two discriminating means for discriminating levels in the in-phase channel and quadrature channel equalized multi-level signals.

3. A radio data transmission system according to claim 2, wherein said modulating means comprises:
means for generating the carrier signal,
means for branching the carrier signal into in-phase channel and quadrature channel carrier signals having a phase difference of 90°,
means for modulating the in-phase channel carrier signal with the in-phase channel multi-level transmission signal to produce an in-phase channel modulated signal,
means for modulating the quadrature channel carrier signal with the quadrature channel multi-level transmission signal to produce a quadrature channel modulated signal,
means for combining the in-phase channel and quadrature channel modulated signals, and wherein said demodulating means comprises:
means for branching the received radio signal into in-phase channel and quadrature channel received signals,
means for recovering the carrier signal in relation with the received radio signal, as a recovered carrier signal,
means for branching the recovered carrier into in-phase channel and quadrature channel recovered carrier signals having a phase difference of 90°,
means for demodulating the in-phase channel received signal using the in-phase channel recovered carrier signal and for outputting an in-phase channel demodulated multi-level signal,
means for demodulating the quadrature channel received signal using the quadrature channel recovered carrier signal and for outputting a quadrature channel demodulated multi-level signal.

4. A radio data transmission system according to claim 2 or 3, wherein said transversal filter means comprises:

delay means for delaying the in-phase channel and quadrature channel multi-level received signals, said delay means for each including a plurality of cascade-connected delay elements and providing the main tap and the other taps to supply tapped signals of a corresponding one of in-phase and quadrature channels, first weighting means for weighting the tapped signals, said weighting means comprising:
a first variable gain amplifier, operatively connected to said demodulating means and said delay means, for amplifying the in-phase channel multi-level received signal with a first gain corresponding to a first weighting signal of the main tap of the in-phase channel and for outputting the amplified in-phase channel multi-level received signal to said delay means corresponding to the in-phase channel, thereby equivalently weighting the main tap thereof, and
a plurality of multipliers, operatively connected to said delay means, for multiplying values corresponding to first weighting signals of the other taps of the in-phase channel to the tapped signals from the other taps of the in-phase channel and for outputting the first weighted signals, second weighting means for weighting the tapped signals, comprising a plurality of multipliers, operatively connected to said delay means, for multiplying values corresponding to second weighting signals, one for each of the main and other taps of the in-phase channel, times the tapped signal from each of the main and other taps of said delay means for the in-phase channel and for outputting the second weighted signals, third weighting means for weighting the tapped signals, comprising a plurality of multipliers, operatively connected to said delay means, for multiplying values corresponding to third weighting signals, one for each of the main and other taps, times the tapped signal from each of the main and other taps of said delay means for the quadrature channel and for outputting the third weighted signal, fourth weighting means for weighting the tapped signals, said fourth weighting means comprising:
a second variable gain amplifier, operatively connected to said demodulating means and said delay means, for amplifying the quadrature channel multi-level received signal with a second gain corresponding to a fourth weighting signal of the main tap of the quadrature channel and for outputting the amplified quadrature channel multi-level received signal to said delay means corresponding to the quadrature channel, thereby equivalently weighting the main tap thereof, and
a plurality of multipliers, operatively connected to said delay means, for multiplying values corresponding to fourth weighting signals of the other taps of the quadrature channel times the tapped signals from the other taps of the quadrature channel and for outputting the fourth weighted signals, a first adder, operatively connected to said multipliers in said first and third weighting means and the main tap of the in-phase channel, for adding the first weighted signals and the third weighted signals and for outputting the quadrature channel equalized multi-level signal.

5. A radio data transmission system according to claim 4, wherein said two discriminating means for the in-phase channel and the quadrature channel output the first to the n-th bits in the converted digital signal for the in-phase channel and the quadrature channel, respectively, the first bit providing a sign signal for the in-phase channel and the quadrature channel, respectively, and the n+1-th bit providing an in-phase channel and an quadrature channel error signal, respectively, and at least one of said two discriminating means outputs the n+1-bit and n+2-th bit for generating the pseudo error pulse.

6. A radio data transmission system according to claim 5,
   wherein said control mode switching means outputs a signal indicative of a current control mode, where the control modes include a normal mode and a reset mode,
   wherein said tap weighting control means comprises:
      an in-phase channel switch, operatively connected to said discriminating means for the in-phase channel and said control mode switching means, for selecting between the sign signal in the normal mode and an alternate signal of "0" and "1" for the in-phase channel in the reset mode in accordance with the signal indicative of the current control mode,
      a quadrature channel switch, operatively connected to said discriminating means for the quadrature channel and said control mode switching means, for selecting between the sign signal in the normal mode and the alternate signal in the reset mode in accordance with the signal indicative of the current control mode,
      in-phase channel and quadrature channel sign/alternate signal delay means operatively connected to receive the outputs of said in-phase channel and quadrature channel switches for outputting delay signals corresponding to the main and other taps of said transversal filter,
      in-phase channel and quadrature channel error signal delay means for delaying the in-phase channel and quadrature channel error signals with a delay corresponding to that of the main tap of said transversal filter to produce delayed in-phase and quadrature error signals,
      first correlation means for performing an exclusive OR between the delay signals corresponding to each tap of said in-phase channel sign/alternate signal delay means and the delayed in-phase channel error signal from said in-phase channel error signal delay means and for outputting a first exclusive OR signal corresponding to each tap of said in-phase channel sign/alternate signal delay means,
      second correlation means for performing an exclusive OR between the delay signals corresponding to each tap of said in-phase channel sign/alternate signal delay means and the delayed quadrature channel error signal from said quadrature channel error signal delay means, and for outputting a second exclusive OR signal corresponding to each tap of said in-phase channel sign/alternate signal delay means,
      third correlation means for performing an exclusive OR between the delay signals corresponding to each tap of said quadrature channel sign/alternate signal delay means and the delayed in-phase channel error signal from said in-phase channel error signal delay means and for outputting a third exclusive OR signal corresponding to each tap of said quadrature channel sign/alternate signal delay means,
      fourth correlation means for performing an exclusive OR between the delay signals corresponding to each tap of said quadrature channel sign/alternate signal delay means and the delayed quadrature channel error signal from said quadrature channel error signal delay means and for outputting a fourth exclusive OR signal corresponding to each tap of said quadrature channel sign/alternate signal delay means,
      first integral means for integrating the first exclusive OR signal corresponding to each tap of said in-phase channel sign/alternate signal delay means to produce the first weighting signal corresponding to each tap of said delay means for the in-phase channel,
      second integral means for integrating the second exclusive OR signal corresponding to each tap of said in-phase channel sign/alternate signal delay means to produce the second weighting signal corresponding to each tap of said delay means for the in-phase channel,
      third integral means for integrating the third exclusive OR signal corresponding to each tap of said quadrature channel sign/alternate signal delay means to produce the third weighting signal corresponding to each tap of said delay means for the quadrature channel,
      fourth integral means for integrating the fourth exclusive OR signal corresponding to each tap of said quadrature channel sign/alternate signal delay means to produce the fourth weighting signal corresponding to each tap of said delay means for the quadrature channel,
   wherein said mode switching means comprises:
      an exclusive NOR gate for performing an exclusive NOR between the n+1-th bit and the n+2-th bit from said discriminating means and for generating the pseudo error pulses,
      an integrator for integrating the pseudo error pulses and for outputting a voltage corresponding to the frequency of the pseudo error pulses,
      a first comparator for comparing a first reference voltage corresponding to a first bit error rate with the output voltage of said integrator,
      a second comparator for comparing a second reference voltage corresponding to a second bit error rate, lower than the first bit error rate with the output voltage of said integrator, and
      control mode holding means for outputting the signal indicative of the current control mode based on the comparing by said first and second comparators, for switching the current control mode from the normal mode to the reset mode when the output voltage of said integrator becomes higher than the first reference voltage, and for switching the current control mode from the reset mode to the normal mode when the output voltage of said integrator becomes lower than the second reference voltage.

7. A radio data transmission system according to claim 5,
   wherein said control mode switching means outputs a signal indicative of a current control mode, where the control modes include a normal mode, a maximum level error (MLE) mode and a reset mode,
   wherein said tap weighting control means comprises:
      an in-phase channel switch, operatively connected to said discriminating means for the in-phase channel and said control mode switching means, for selecting between the sign signal in the normal mode and an alternate signal of "0" and "1" for the in-phase channel in the reset mode in accordance with the signal indicative of the current control mode, a quadrature channel switch, operatively connected to said discriminating means for the quadrature channel and said control mode switching means, for selecting between the sign signal in the normal mode and the alternate signal in the reset mode in accordance with the signal indicative of the current control mode, in-phase channel and quadrature channel sign/alternate signal delay means operatively connected to receive the outputs of said in-phase channel and quadrature channel switches for outputting delay signals corresponding to the main the other taps of said transversal filter, in-phase channel and quadrature channel error signal delay means for delaying the in-phase channel and quadrature channel error signal with a delay corresponding to that of the main tap of said transversal filter to produce delayed in-phase and quadrature error signals, first correlation means for performing an exclusive OR between the delay signals corresponding to each tap of said in-phase channel sign/alternate signal delay means and the delayed in-phase channel error signal from said in-phase channel error signal delay means and for outputting a first exclusive OR signal corresponding to each tap of said in-phase channel sign/alternate signal delay means, second correlation means for performing an exclusive OR between the delay signals corresponding to each tap of said in-phase channel sign/alternate signal delay means and the delayed quadrature channel error signal from said quadrature channel error signal delay means, and for outputting a second exclusive OR signal corresponding to each tap of said in-phase channel sign/alternate signal delay means, third correlation means for performing an exclusive OR between the delay signals corresponding to each tap of said quadrature channel sign/alternate signal delay means and the delayed in-phase channel error signal from said in-phase channel error signal delay means and for outputting a third exclusive OR signal corresponding to each tap of said quadrature channel sign/alternate signal delay means, fourth correlation means for performing an exclusive OR between the delay signals corresponding to each tap of said quadrature channel sign/alternate signal delay means and the delayed quadrature channel error signal from said quadrature channel error signal delay means and for outputting a fourth exclusive OR signal corresponding to each tap of said quadrature channel sign/alternate signal delay means, in-phase channel and quadrature channel MLE control means, comprising:

in-phase channel and quadrature channel MLE detection means for detecting the maximum level error from the first to n+1−th bits from said discriminating means for the in-phase channel and quadrature channel, respectively, and for outputting MLE signals, in-phase channel and quadrature channel MLE signal leading edge detection means for detecting the leading edges of the in-phase channel and quadrature channel MLE signals and for outputting the in-phase channel and quadrature channel leading edge detecting pulses, respectively, in-phase channel and quadrature channel MLE signal delay means for delaying the in-phase channel and quadrature channel MLE signals, for supplying the in-phase channel and quadrature channel MLE signals being delayed to said in-phase channel and quadrature channel MLE signal leading edge detection means when the leading edge pulses of the in-phase channel and quadrature channel are generated and for outputting the delayed MLE signals of the in-phase channel and quadrature channel, respectively, in-phase channel and quadrature channel selection means for respectively responding to the first and fourth exclusive OR signals corresponding to the main tap from said first and fourth correlation means, the delayed MLE signals of the in-phase channel and the quadrature channel, and the leading edge pulses of the in-phase and quadrature channels and for selectively outputting the delayed MLE signals of the in-phase channel and the quadrature channel among the first to fourth exclusive OR signals corresponding to the main tap and the delayed MLE signals of the in-phase channel and the quadrature channel when an alarm signal is generated, first and second holding means for responding to the first and fourth exclusive OR signals corresponding to the main tap of the in-phase channel and the quadrature channel supplied by said in-phase channel and quadrature channel selection means, respectively, the delayed MLE signals of the in-phase channel and the quadrature channel and to the first and fourth exclusive OR signals corresponding to the other taps of the in-phase channel and the quadrature channel, respectively, third and fourth holding means for holding the second and third exclusive OR signal corresponding to each tap, and first to fourth integral means for integrating the outputs of said first to fourth holding means corresponding to each tap and for outputting the first to fourth weighting signals corresponding to each tap, wherein said mode switching means comprises:

an exclusive NOR gate for performing an exclusive NOR operation of the N+1−th bit and the n+2-th bit from said discriminating means and for generating the pseudo error pulses, an integrator for integrating the pseudo error pulses and for outputting a voltage corresponding to the frequency of the pseudo error pulses, reference voltage switching means for selecting and outputting one of a voltage corresponding to a first bit error rate and a voltage corresponding to a second bit error rate, lower than the first bit error rate, comparison means for comparing the output voltage of said reference voltage switching means and the output voltage of said integrator, for causing said integrator to generate an alarm signal and for switching said reference voltage switching means to selectively output the second reference voltage when the output voltage of said integrator is higher and the first reference voltage when the output voltage of said integrator is lower, fourth comparison means for comparing the third reference voltage corresponding to a third bit error rate with the output voltage of said integrator, and a timer for periodically outputting the reset signal when the output voltage of said integrator is higher than the third reference voltage.

* * * * *